(12) United States Patent
Schneider et al.

(10) Patent No.: US 11,048,217 B2
(45) Date of Patent: Jun. 29, 2021

(54) METHOD AND SYSTEM FOR AN AUTOMATED CONFIGURATION OF AN INDUSTRIAL CONTROLLER

(71) Applicant: CODESYS Holding GmbH, Kempten (DE)

(72) Inventors: Christoph Schneider, Bad Nenndorf (DE); Dieter Hess, Lauben (DE)

(73) Assignee: CODESYS Holding GmbH, Kempten (DE)

( * ) Notice: Subject to any disclaimer, the term of this patent is extended or adjusted under 35 U.S.C. 154(b) by 128 days.

(21) Appl. No.: 15/921,452

(22) Filed: Mar. 14, 2018

(65) Prior Publication Data

US 2018/0267492 A1 Sep. 20, 2018

(30) Foreign Application Priority Data

Mar. 14, 2017 (EP) .................................. 17160846

(51) Int. Cl.
*G05B 19/042* (2006.01)
*G05B 19/05* (2006.01)
*G05B 19/418* (2006.01)

(52) U.S. Cl.
CPC ....... *G05B 19/0426* (2013.01); *G05B 19/056* (2013.01); *G05B 19/41845* (2013.01); *G05B 2219/1214* (2013.01); *G05B 2219/15007* (2013.01); *G05B 2219/23332* (2013.01); *G05B 2219/25112* (2013.01); *G05B 2219/31422* (2013.01); *Y02P 90/02* (2015.11)

(58) Field of Classification Search
CPC .............. G05B 19/0426; G05B 19/056; G05B 19/41845; G05B 2219/1214; G05B 2219/15007; G05B 2219/23332; G05B 2219/25112; G05B 2219/31422; Y02P 90/16; Y02P 90/18
See application file for complete search history.

(56) References Cited

U.S. PATENT DOCUMENTS

| 5,801,942 | A | 9/1998 | Nixon et al. | |
|---|---|---|---|---|
| 2002/0045970 | A1* | 4/2002 | Krause | B25J 9/1656 700/264 |
| 2003/0061311 | A1* | 3/2003 | Lo | G05B 19/0426 709/220 |

(Continued)

FOREIGN PATENT DOCUMENTS

| CA | 2056829 A1 * | 6/1992 | ............. G05B 19/05 |
|---|---|---|---|
| WO | 2001/73546 A2 | 10/2001 | |

(Continued)

OTHER PUBLICATIONS

European Search Report, dated Oct. 5, 2017 issued in priority EP appln No. 17 16 0846.6 (7 pgs).

*Primary Examiner* — Chad G Erdman
(74) *Attorney, Agent, or Firm* — Steven J. Grossman; Grossman, Tucker, Perreault & Pfleger, PLLC (57) ABSTRACT

A method for automated configuration of an industrial controller comprises the steps of providing an identification from an industrial controller to a server connected to said industrial controller via a network, said identification identifying said industrial controller, and receiving, from said server via said network, an industrial program and/or a parameter for an industrial program in accordance with said identification.

18 Claims, 3 Drawing Sheets

(56) References Cited

U.S. PATENT DOCUMENTS

| | | | |
|---|---|---|---|
| 2003/0093159 A1* | 5/2003 | Sieminski | A01G 25/167 700/12 |
| 2007/0198752 A1 | 8/2007 | Danz et al. | |
| 2009/0216344 A1 | 8/2009 | Bretin | |
| 2013/0116801 A1 | 5/2013 | Chu et al. | |
| 2013/0158708 A1* | 6/2013 | Emmertz | G05B 19/0426 700/248 |
| 2014/0136302 A1* | 5/2014 | Song | G05B 19/0426 705/14.4 |
| 2014/0277592 A1* | 9/2014 | Crater | G05B 19/052 700/9 |
| 2015/0264144 A1* | 9/2015 | Hewett | H04L 67/18 709/224 |
| 2017/0039221 A1* | 2/2017 | Kay | G06F 16/182 |
| 2017/0331795 A1* | 11/2017 | Martin | H04L 63/0428 |

FOREIGN PATENT DOCUMENTS

| | | | |
|---|---|---|---|
| WO | 2005/093530 A2 | 10/2005 | |
| WO | 2007/104868 A2 | 9/2007 | |

\* cited by examiner

METHOD AND SYSTEM FOR AN AUTOMATED CONFIGURATION OF AN INDUSTRIAL CONTROLLER

FIELD OF THE INVENTION

The present invention relates to the field of industrial control, in particular to methods and systems for configuring or re-configuring industrial controller units in an industrial control environment or network.

BACKGROUND OF THE INVENTION

Industrial control networks are ubiquitous in many areas of industry and manufacturing, and may comprise a plurality of industrial controllers, wherein each of the controllers stores a designated control software program and possibly control parameters adapted to control a machinery or group of machinery connected to the respective controller. The controllers may be integrated into the machinery, or may be stand-alone control devices.

Many controllers regularly require an update or reconfiguration of their control software, including industrial programs and/or parameters. For instance, new improved versions of the control program or parts thereof may become available, and the user may want to update the controller accordingly. Alternatively, the role of the associated machinery in the manufacturing process may change, and hence the controller needs to be updated to reflect this reconfiguration. In addition, parameters of control programs may change over time due to a change in manufacturing lots or recipes.

In the prior art, updates or re-configurations of controllers are often done manually, such as via re-programming, and new software or parameters may be uploaded to the industrial controller via a laptop computer or serial interface. In many industrial control environments, the individual controllers are connected via data network, and in this case the update may be performed remotely via the data network, by accessing the individual controllers one by one.

However, in all these use cases, the update requires skilled user interaction, either locally or remotely. As a result, an update can be costly and time-consuming. In addition, even well-trained users sometimes make mistakes, and there is always the risk that a controller is updated with the wrong industrial program or parameters, which may lead to manufacturing downtime, or even damage to the machinery.

What is needed is a method and system for a controller update that can be more easily administrated and is less time-consuming and error-prone.

OVERVIEW OF THE INVENTION

This objective is achieved with a method for automated configuration of an industrial controller according to independent claims 1 and 5, an industrial controller according to independent claim 10 and a server for an industrial controller according to independent claim 12. The dependent claims relate to preferred embodiments.

A method for an automated configuration of an industrial controller in accordance with a first aspect of the invention comprises the steps of providing an identification from an industrial controller to a server connected to said industrial controller via a network, said identification identifying said industrial controller, and receiving, from said server via said network, an industrial program and/or a parameter for an industrial program in accordance with said identification.

By providing an identification of the industrial controller to a server, and receiving industrial programs and/or parameters for industrial programs in accordance with said identification, the method according to the present invention allows for an automated, tailored update or re-configuration that is quick, efficient and less prone to failures. A user interaction may be limited to an update of the server, which may provide industrial programs and/or parameters to a large number of controllers in the network.

According to said identification, different industrial controllers may receive different industrial programs and/or parameters.

For instance, a first industrial controller may receive a first industrial program and/or a first parameter for said first industrial program in accordance with a first identification provided by said first industrial controller.

A second industrial controller different from said first industrial controller may receive a second industrial program and/or a second parameter for said second industrial program in accordance with a second identification different from said first identification, wherein said second industrial program and/or said second parameter are different from said first industrial program and/or first parameter, respectively.

An identification, in the sense of the present disclosure, may denote any piece of data or information that informs the server about the industrial controller in the network. An identification may consist of a simple status message. In some embodiments, said identification may comprise information about a type, model or operating parameters of said industrial controller. Said identification may also comprise information about industrial programs and/or parameters currently stored on said industrial controller. Moreover, said identification may comprise information about the location of said industrial controller or its position in the network.

Said identification may comprise a name of said industrial controller, such as a unique name or a name assigned to said controller in said network.

Said identification may also comprise a serial number of said industrial controller.

In an embodiment, said identification may comprise a network address of said industrial controller, and/or a mac address of said industrial controller, and/or an IP address of said industrial controller.

An identification, in the sense of the present disclosure, may uniquely identify a particular controller. In these embodiments, the correspondence between controllers and identifications may be one-to-one.

In other embodiments, the identification may denote a type of controller, and hence may refer to a group of controllers that are identical, or identical for all purposes of the configuration under consideration.

An industrial program, in the context of the present disclosure, may generally refer to any software or firmware adapted to run on said industrial controller, or parts of said software or firmware.

In particular, said industrial program may comprise or may consist of an industrial control program, or parts thereof. Said industrial control program may be in the form of compiled machine code, ladder logic, or in some other format, such as in the form of a high-level programming language source code.

Said industrial program may also comprise or may consist of at least one application function for an industrial control program, or parts thereof.

An application function, in the sense of the present disclosure, may refer to any software or firmware adapted to perform a specific functionality in the context of an industrial control program. For instance, an application function may govern the way the control program logs measurement data on a remote database. Another application function may govern a sequence of manufacturing steps on the industrial controller such as pertaining to a temperature control.

Said parameters may be single parameters, or may comprise sets or groups of parameters.

Said parameters for said industrial program, in accordance with the present disclosure, may be any parameters or variables required by the industrial program. For instance, a set of said parameters could be a recipe for a production process.

Said parameters can be in any format, i.e., alphanumeric variables or Boolean, integer or real values. Said parameters can also be or comprise data files.

In an embodiment, said method comprises a step of updating an industrial control program running on said industrial controller in accordance with said industrial program and/or said parameter.

Said method may also comprise the step of starting said industrial program, in particular in accordance with said parameter, and/or running said industrial controller in accordance with said industrial program and/or said parameter.

As described above, said identification may be provided from said industrial controller to said server automatically, or without user interaction.

Similarly, said industrial program and/or said parameter may be received from said server automatically, or without user interaction.

In an embodiment, said industrial controller provides said identification upon being connected to said network.

For instance, said identification may be provided as part of an initialization routine in which a controller being newly connected to said network registers with the server. In response to said initialization, the server may provide the industrial programs and/or parameters that assist the industrial controller to perform its functions within the control network. Advantageously, after the user has connected the industrial controller to the network, no further user interaction may be required to initialize or configure the industrial controller.

In an embodiment, said industrial controller may provide said identification in response to a command or selection by a user.

For instance, said industrial controller may comprise a user interface, such as a push button, wherein said user interface triggers said step of providing said identification from said industrial controller to said server.

For instance, said user may connect a new industrial controller to an existing network, and may push said push button to cause said industrial controller to provide said identification to said server. Alternatively or additionally, said industrial controller maybe pre-programmed to provide said identification upon occurrence of a pre-defined event.

For instance, said event may be an error signal triggered during operation of the industrial controller because a certain parameter necessary for operation of the industrial controller is missing or ill-defined. The industrial controller may then identify to the server to request the missing parameter from the server.

Alternatively or additionally, said industrial controller may provide said identification cyclically, e.g., at pre-defined time intervals. This allows the industrial controller to regularly request updates of industrial programs and/or parameters from said server.

In an embodiment, said server may modify, such as amend and/or change and/or replace said identification.

Said method may then comprise a step of receiving, from said server via said network, a modified identification.

In this instance, said method may comprise a step of receiving, from said server via said network, said industrial program and/or said parameter for said industrial program in accordance with said modified identification.

For instance, said modified identification may be an identification of another industrial controller that previously left said network, or became dysfunctional.

Said server may determine that an industrial controller that is connected to said network is a replacement for said another removed and/or dysfunctional industrial controller, and may assign to said industrial controller an identification of said another removed and/or dysfunctional industrial controller. In an embodiment, said identification comprises a request for said industrial program and/or said parameter.

In this embodiment, the industrial controller itself may determine the functionalities, industrial programs and/or parameters it requires to perform its task, and may request them from the server.

In these configurations, the server may implement a relationship between said identification of said industrial controller and said industrial program and/or said parameter by means of a database, and may provide the requested industrial program and/or parameters to the industrial controller in accordance with entries of said database.

In other embodiments, it may be the server that actively manages industrial programs and/or parameters for said industrial controller. In these embodiments, said identification may merely serve to make the server aware of the existence of the industrial controller in the network, as well as its model or type. Said server may subsequently initiate communication with said industrial controller and provide industrial programs and/or parameters for said industrial programs to said industrial controller, in particular without waiting for a request from said industrial controller.

Other than controller-initiated configuration and server-initiated configuration, mixed forms also fall within the scope of the present invention.

For instance, in an embodiment, the method may further comprise a step of receiving, from said server via said network, a list of industrial programs available for configuration.

Preferably, said controller may receive said list in response to providing said identification to said server.

The method may further comprise a step of selecting, from among said list, a desired industrial program, and requesting said desired industrial program from said server via said network.

In an embodiment, the method further comprising a step of sending a request for a parameter pertaining to said desired industrial program to said server via said network.

The method may also comprise a step of receiving said parameter from said server via said network.

Hereinbefore, the invention has been described from the perspective of said industrial controller. In a second aspect, the invention relates to a corresponding method performed at the server end.

A method for automated configuration of an industrial controller according to a second aspect of the invention comprises a step of receiving, at a server, an identification from an industrial controller connected to said server via a network, said identification identifying said industrial controller, and providing an industrial program and/or a parameter for an industrial program to said industrial controller via said network in accordance with said identification.

Said identification may be received from said industrial controller automatically, or without user interaction.

Similarly, said industrial program and/or said parameter may be provided to said industrial controller automatically, or without user interaction.

As described above, the automatic configuration or update allows to greatly simplify the configuration of control networks, and reduces the configuration time and cost as well as the risk of errors and malfunctions.

In an embodiment, the method comprises a step of providing, to said industrial controller via said network, a list of industrial programs available for configuration on said industrial controller.

Preferably, said list may be provided in response to said identification received from said industrial controller.

Said method may further comprise a step of receiving, from said industrial controller via said network, a request for a desired industrial program.

Said method may further comprise a step of providing said desired industrial program to said industrial controller via said network.

Said method may further comprise a step of receiving, from said industrial controller via said network, a request for a parameter pertaining to said desired industrial program.

In an embodiment, said method further comprises a step of providing said parameter to said industrial controller via said network.

In these examples, the server may provide the controller with a list of available industrial programs and/or parameters from which the controller may select, such as depending on its type or role in the network.

In other embodiments, said method may be server-initiated, and said server may provide the industrial programs and/or parameters that said server determines appropriate for said industrial controller.

In an embodiment, said method comprises a step of modifying said identification received from said industrial controller.

Said method may also comprise a step of providing said industrial program and/or said parameter for said industrial program to said industrial controller via said network in accordance with said modified identification.

Said method may also comprise a step of providing said modified identification to said industrial controller.

As explained above, said modified identification may be an identification of another industrial controller that became dysfunctional and/or was removed from said network.

In an embodiment, said step of providing said industrial program and/or said parameter for said industrial program comprises providing said industrial program and/or said parameter for said industrial program to a group of industrial controllers.

Said group may comprise at least two industrial controllers.

Said group may comprise n industrial controllers, wherein n may be any integer value no smaller than two.

The possibility of providing said industrial program and/or said parameter for said industrial program to an entire group of industrial controllers significantly simplifies the maintenance and updating of large networks of controllers.

In said instance, said identification may denote or identify said group of industrial controllers.

In particular, said method may comprise a step of broadcasting said industrial program and/or said parameter for said industrial program to said group of industrial controllers.

In an embodiment, said industrial program is an industrial control program ready to run on said industrial controller.

Said industrial program may be a compiled industrial program, such as a compiled industrial control program.

Said server may comprise a database unit, said database unit comprising industrial programs and associated program code, and/or a table listing industrial controllers and associated industrial programs and/or associated parameters.

Said industrial program and/or said parameter for said industrial program may be provided to said industrial controller in accordance with the contents of said database unit, in particular in accordance with said table.

Said database may allow to efficiently collect and manage industrial programs and/or associated parameters for a large number of industrial controllers. Said database hence greatly facilitates the update of industrial programs and/or parameters.

Said method may comprise a step of receiving said industrial program and/or said parameter for said industrial program from a user or client, in particular via said network.

Said method may also comprise a step of storing said industrial program and/or said parameter for said industrial program in a database.

Said industrial program may be received and stored in compiled format, and may be provided to said industrial controller in compiled format.

In an embodiment, said method may comprise a step of compiling said industrial program.

For example, said method may comprise a step of receiving said industrial program as a source code, and storing said source code in a database unit.

Said source code may then be compiled only upon said server receiving a request for said industrial control program from an industrial controller, or only before said server decides, in a server-initiated update, to provide said industrial program to said industrial controller.

In other embodiments, said method comprises a step of receiving said industrial program as a source code, compiling said source code upon receipt, and storing said compiled industrial program in a database unit.

The invention further relates to a computer program or to a computer program product comprising computer-readable instructions, wherein said instructions, when read on a computer, implement on said computer a method with some or all of the features described above.

In the first aspect, the invention further relates to an industrial controller, comprising an identification unit adapted to provide an identification from said industrial controller to a server connected to said industrial controller via a network, said identification identifying said industrial controller, and a controller receiving unit adapted to receive, from said server via said network, an industrial program and/or a parameter for an industrial program in accordance with said identification.

Said network, in the context of the present invention, may denote any communication or data network connecting a server and one or a plurality of industrial controllers.

Said industrial controller may be adapted to perform a method with some or all of the features described above with reference to the first aspect of the invention.

Said identification unit and/or said controller receiving unit may be implemented in software or in hardware, or in a combination of software and hardware.

Said identification unit may be adapted to receive, from a user, a user command or user input, such as via a user interface.

Said identification unit may be further adapted to provide said identification to said server in response to said user command or user input.

Said identification unit may be further adapted to receive, from said server, a modified identification.

Said controller receiving unit may be adapted to receive, from said server via said network said industrial program and/or said parameter for said industrial program in accordance with said modified identification.

Said controller receiving unit may be adapted to receive, from said server via said network, a list of industrial programs available for configuration, preferably in response to said identification.

Said industrial controller may further comprise a controller processing unit adapted to select, from among said list, a desired industrial program.

Said controller processing unit may be further adapted to request said desired industrial program from said server via said network.

Said controller processing unit may be implemented in software or in hardware, or in a combination of software and hardware.

In the second aspect, the invention further relates to a server for an industrial controller, comprising a server receiving unit adapted to receive an identification from an industrial controller connected to said server via a network, said identification identifying said industrial controller, and a configuration unit adapted to provide an industrial program and/or a parameter for an industrial program to said industrial controller via said network in accordance with said identification.

Said server may be adapted to perform a method with some or all of the features described above in connection with the second aspect of the invention.

Said server receiving unit and/or said configuration unit may be implemented in software or hardware, or in a combination of software and hardware.

Said configuration unit may be adapted to provide said industrial program and/or said parameter for said industrial program to a group of industrial controllers.

In an embodiment, said group may comprise n industrial controllers wherein n may be any integer value no smaller than two.

In an embodiment, said server receiving unit may be adapted to modify said identification received from said industrial controller.

For instance, said server receiving unit may be adapted to modify, e.g. to amend and/or change and/or replace said identification to a modified identification corresponding to an identification of another industrial controller, wherein said another industrial controller may be a controller that was removed from said network and/or became dysfunctional.

Said server receiving unit may also be adapted to provide said modified identification to said industrial controller.

Said configuration unit may be adapted to provide said industrial program and/or said parameter for said industrial program to said industrial controller via said network in accordance with said modified identification.

In an embodiment, said configuration unit may be adapted to provide to said industrial controller via said network, a list of industrial programs available for configuration on said industrial controller, preferably in response to said identification received from said industrial controller.

Said server receiving unit may be adapted to receive, from said industrial controller via said network, a request for a desired industrial program.

In an embodiment, said configuration unit may be adapted to provide said desired industrial program to said industrial controller via said network.

Said server receiving unit may be further adapted to receive, from said industrial controller via said network, a request for a parameter pertaining to said desired industrial program.

Said configuration unit may be further adapted to provide said parameter to said industrial controller via said network.

In an embodiment, said server comprises a database unit, said database unit comprising industrial programs and associated program code, and/or a table listing industrial controllers and associated industrial programs and/or associated parameters, wherein said configuration unit is adapted to provide said industrial program and/or said parameter for said industrial program to said industrial controller in accordance with said database unit, in particular in accordance with said table.

Said database unit may be implemented in hardware or in software, or in a combination of hardware and software.

Said server may comprise a compiler unit.

Said compiler unit may be adapted to compile an industrial control program received at said server as a source code, and preferably be further adapted to store said compiled source code in said database unit.

Alternatively, said server may be adapted to receive said industrial program in source code format, and to store said source code format in said database unit.

Said compiler unit, in said latter embodiment, may be adapted to compile said source code stored in said database to obtain a compiled industrial program, and said configuration unit may be adapted to provide said compiled industrial program to said industrial controller.

Said server may comprise an interface unit for receiving said industrial program and/or said parameter for said industrial program.

Said interface unit may be a web interface.

Said server may be adapted to store said industrial program and/or said parameter for said industrial program received at said interface unit in said database unit.

The invention further relates to a system for automated configuration of an industrial controller, comprising a server with some or all of the features described above and at least one industrial controller with some or all of the features described above, wherein said server and said at least one controller are connected via said network.

BRIEF DESCRIPTION OF THE DRAWINGS

The features and numerous advantages of the method and system according to the present invention will be best understood from a detailed description of preferred embodiments with reference to the drawings, in which.

DETAILED DESCRIPTION OF EMBODIMENTS

Figure 1:
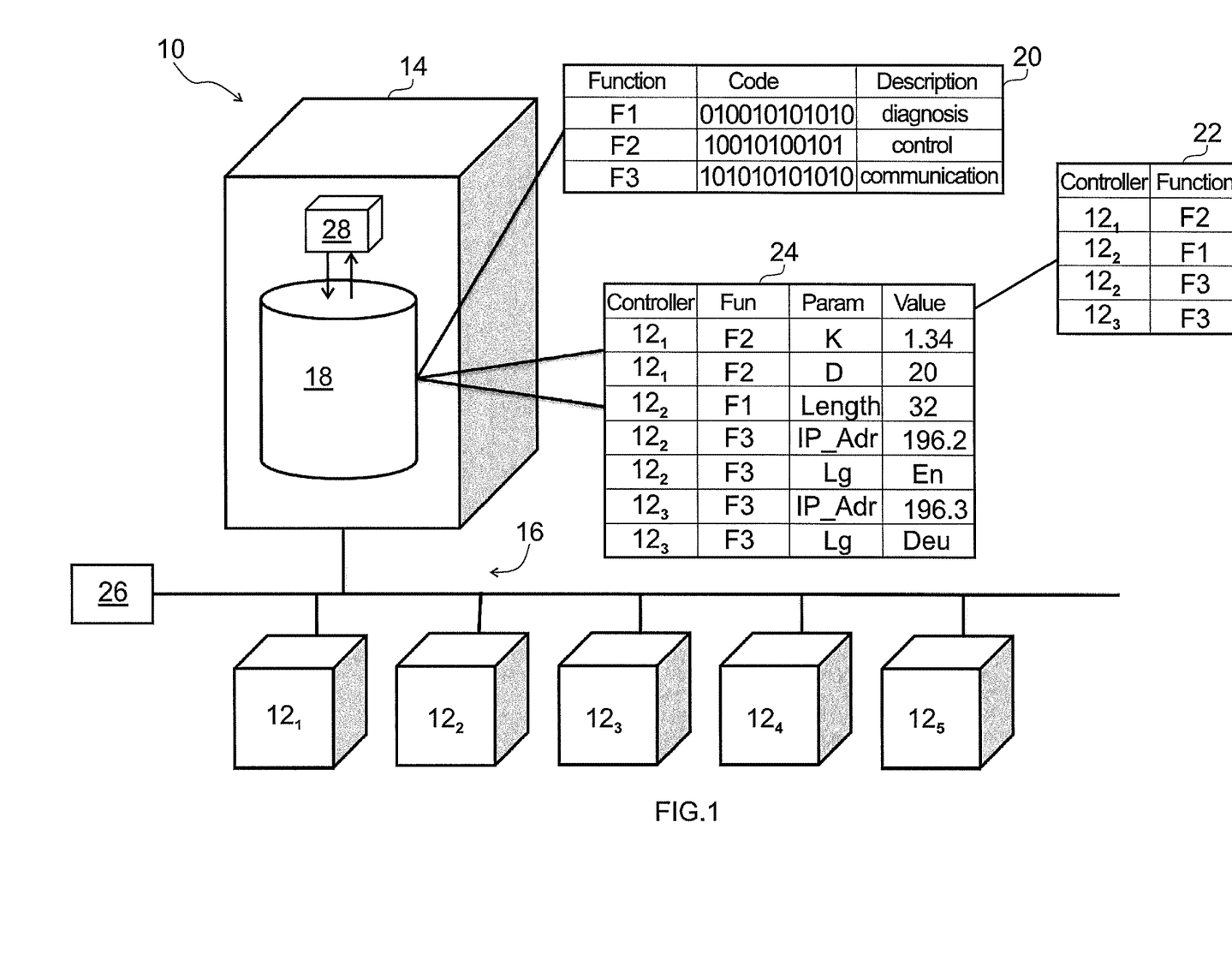
FIG. 1 is a schematic overview of an industrial control network in which a method and system according to the present invention may be employed.

A method and system for automated configuration of an industrial controller will now be described for the example of an industrial control environment 10 comprising a plurality of industrial controller units $12_1$ to $12_5$ connected to a database server 14 via a control network 16.

For instance, the industrial control environment 10 may be a factory environment, and each of the industrial controller units $12_1$ to $12_5$ may control a separate machine or tool (not shown) connected to the industrial controller units $12_1$ to $12_5$ in the industrial control environment 10. Each of the industrial controller units $12_1$ to $12_5$ may be equipped with their own processor and memory (not shown) and may run an industrial control program for controlling the associated machine or tool. The control program may be stored locally in the memory of the respective industrial controller unit $12_1$ to $12_5$, such as in the form of compiled machine code or ladder logic instructions. The industrial control program may run on the processor of the respective industrial controller unit $12_1$ to $12_5$ and may rely on and call parameters stored locally in the respective memory, or provided remotely via the control network 16. These parameters may be recipe parameters or other input variables required by the control program for operation of the machinery or tool. Moreover, each of the industrial controller units $12_1$ to $12_5$ may generate output variables or log files, and may store them locally in memory or upload them to the database server 14 or a central management unit (not shown) over the control network 16.

The control network 16 may be any data network adapted for communication and data exchange back and forth between the industrial controller units $12_1$ to $12_5$ and the database server 14, either wired or wireless or mixed. For instance, the control network 16 may be a local area network. If some of the industrial controller units $12_1$ to $12_5$ are located remotely, or distributed over a large area, the control network 16 could also be the Internet.

FIG. 1 shows a configuration with five industrial controller units $12_1$ to $12_5$. However, this is for illustration only, and in practical implementations the industrial control environment 10 may comprise a single industrial controller unit or any number of industrial controller units. It is a particular advantage of the method and system according to the present invention that it can simplify a configuration or reconfiguration of a large number of industrial controller units from a single database server 14.

The database server 14 may comprise a database 18 that can store industrial programs and/or parameters for industrial programs for a large number of industrial controller units $12_1$ to $12_5$.

For instance, the industrial programs may comprise machine code for functionalities that may be required by one or more of the industrial controller units $12_1$ to $12_5$, such as machine code relating to diagnosis functionalities, control functionalities, or communication functionalities. An exemplary application function table 20 is schematically shown in FIG. 1. The application function table 20 comprises three application functions F1, F2, F3 that may be required by the control program running on one or more of the industrial controller units $12_1$ to $12_5$, together with corresponding machine code and a description.

The database 18 may further comprise a controller table 22 listing which of the functions F1, F2, F3 is stored on each of the industrial controller units $12_1$ to $12_5$.

In the specific example described above, each of the reference numerals $12_1$ to $12_5$ serve as an identification that denotes an individual industrial controller unit. However, in other examples one such reference numeral may denote an entire group of individual industrial controllers, which are identical in terms of the application functions and parameters that they require, and hence do not need to be distinguished in the controller table 22 or parameter table 24.

The database 18 may further comprise a parameter table 24, which in addition lists parameters and their values as they may be required or called by the application functions F1, F2, F3. As illustrated in the parameter table 24, the parameters required for a given application function, and their values, may depend on the industrial controller unit $12_1$ to $12_5$ on which the function is supposed to run.

The schematic drawing of FIG. 1 shows only three application functions F1, F2, F3 and a rather small number of parameters. However, this is for illustration only, and in practical applications there may be a large number of application functions and parameters, depending on the industrial control environment 10.

Once new application functions or new versions of application functions become available, they may be uploaded to the database server 14 and incorporated into the database 18, and may be associated to the respective industrial controller unit $12_1$ to $12_5$ in the controller table 22 and parameter table 24. Similarly, the parameter table 24 may be updated centrally on the database server 14 when new parameter values for any of the application functions F1, F2, and F3 become available. This is an advantage over prior art techniques, in which the industrial program and/or parameters for the industrial program are only stored locally in the industrial controller units, and need to be updated on every industrial controller unit separately.

There may be different techniques of how an industrial program, such as an application function, and/or a parameter for an industrial program may be made available on the database server 14. For instance, the industrial program and/or parameter may be uploaded to the database server 14 via a user client interface 26 connected to the control network 16. In embodiments in which the database server 14 is connected to the internet, the industrial program and/or parameters may be uploaded to the database server 14 via a web application.

The industrial program and/or parameters may be uploaded into the database server 14 and stored in the database 18 in different formats. In some examples, the industrial program, such as the application function, may be uploaded and stored in the database 18 as pre-compiled code. In these examples, the pre-compiled code may be directly provided to the respective controller unit $12_1$ to $12_5$.

In other examples, the industrial program may be provided to the database server 14 as source code, and may be stored in the database 18 and provided to the respective industrial controller $12_1$ to $12_5$ as a source code file. The industrial program may then be compiled locally on the respective industrial controller $12_1$ to $12_5$. In a variant, the database server 14 comprises a compiler unit 28 that compiles the source file before it is provided to the respective industrial controller $12_1$ to $12_5$.

In still other examples, the database server 14 comprises a compiler unit 28 that receives updates of the industrial program in source code from the client interface 26, compiles them for each of the various controllers $12_1$ to $12_5$ and stores the respective compiled programs in the database 18. The compiled industrial programs may then be provided to the respective industrial controller 12$_1$ to 12$_5$ upon request. In this example, some of the customization of the provided source code to the respective controller 12$_1$ to 12$_5$ may be taken care of locally in the database server 14, during compilation.

Each of the industrial controller units 12$_1$ to 12$_5$ may regularly, such as at predetermined time intervals, call the database server 14 for updates of their industrial programs.

For instance, according to the controller table 22 the industrial controller unit 12$_1$ requires the application function F2. The industrial controller unit 12$_1$ may hence inquire at regular intervals with the database server 14 whether a new version of the application function F2 is available on the database server 14. If so, the industrial controller unit 12$_1$ may request the database server 14 to send the new version of the application function F2 over the control network 16.

According to the parameter table 24, the application function F2 for the industrial controller unit 12$_1$ depends on the two parameters K and D, and the parameter table 24 stores their specific values. These parameter values K and D may change regularly, for instance due to a change in a recipe. A user would then update these parameter values in the parameter table 24.

Once the control program calling the application function F2 on the industrial controller unit 12$_1$ requires one of the parameter values K or D, it will send a request to the database server 14 over the control network 16, and the database server 14 will provide these values in accordance with the updated parameter table 24.

In other embodiments, the database server distributes the application functions F1, F2, F3 and their parameters to the respective industrial controller units 12$_1$ to 12$_5$ whenever there is a change or update in the application function or one of the parameters, respectively.

Figure 2:
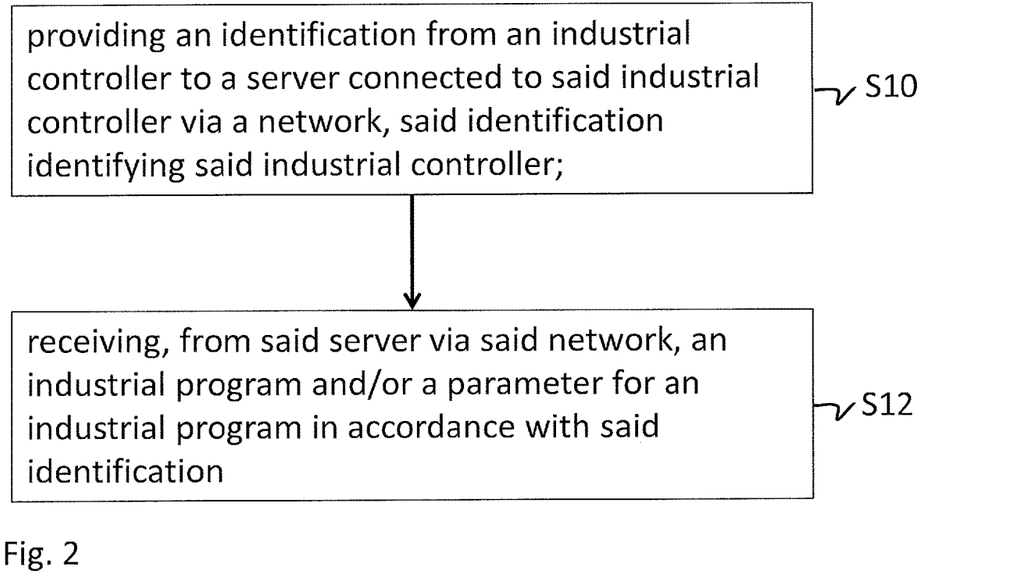
FIG. 2 is a flow diagram illustrating a method for automated configuration implemented on an industrial controller according to an embodiment.

FIG. 2 is a flow diagram illustrating a method for automated configuration from the controller perspective.

In a first step S10, an identification is provided from one of the industrial controllers 12$_1$ to 12$_5$ to the database server 14 connected to the controller 12$_1$ to 12$_5$ via the control network 16.

Said identification identifies said industrial controller 12$_1$ to 12$_5$ to said database server 14. For instance, said identification may comprise a name of said industrial controller unit 12$_1$ to 12$_5$ in said control network 16, and/or may comprise a type or model of said industrial controller unit 12$_1$ to 12$_5$.

In a second step S12, the respective industrial controller unit 12$_1$ to 12$_5$ receives, from said database server 14 via said control network 16, an industrial program and/or a parameter for an industrial program in accordance with said identification.

For instance, said industrial program may be an updated version of one of the application functions F1, F2, F3.

Figure 3:
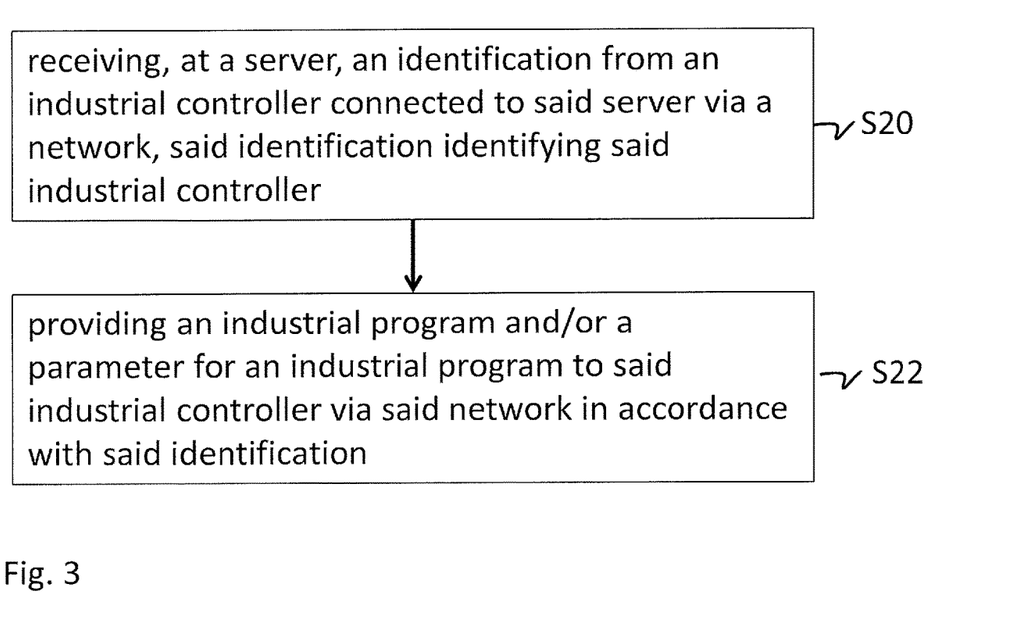
FIG. 3 is a flow diagram illustrating a method for automated configuration implemented on a server according to an embodiment.

FIG. 3 illustrates a method for automated configuration from the complementary perspective of the database server 14.

In a first step S20, the database server 14 receives an identification from an industrial controller unit 12$_1$ to 12$_5$ connected to the database server 14 via the control network 16.

As described above, said identification identifies said industrial controller unit 12$_1$ to 12$_5$ in said control network 16.

In a second step S22, the database server 14 provides an industrial program and/or a parameter for an industrial program to said industrial controller unit 12$_1$ to 12$_5$ via said control network 16 in accordance with said identification.

Figure 4:
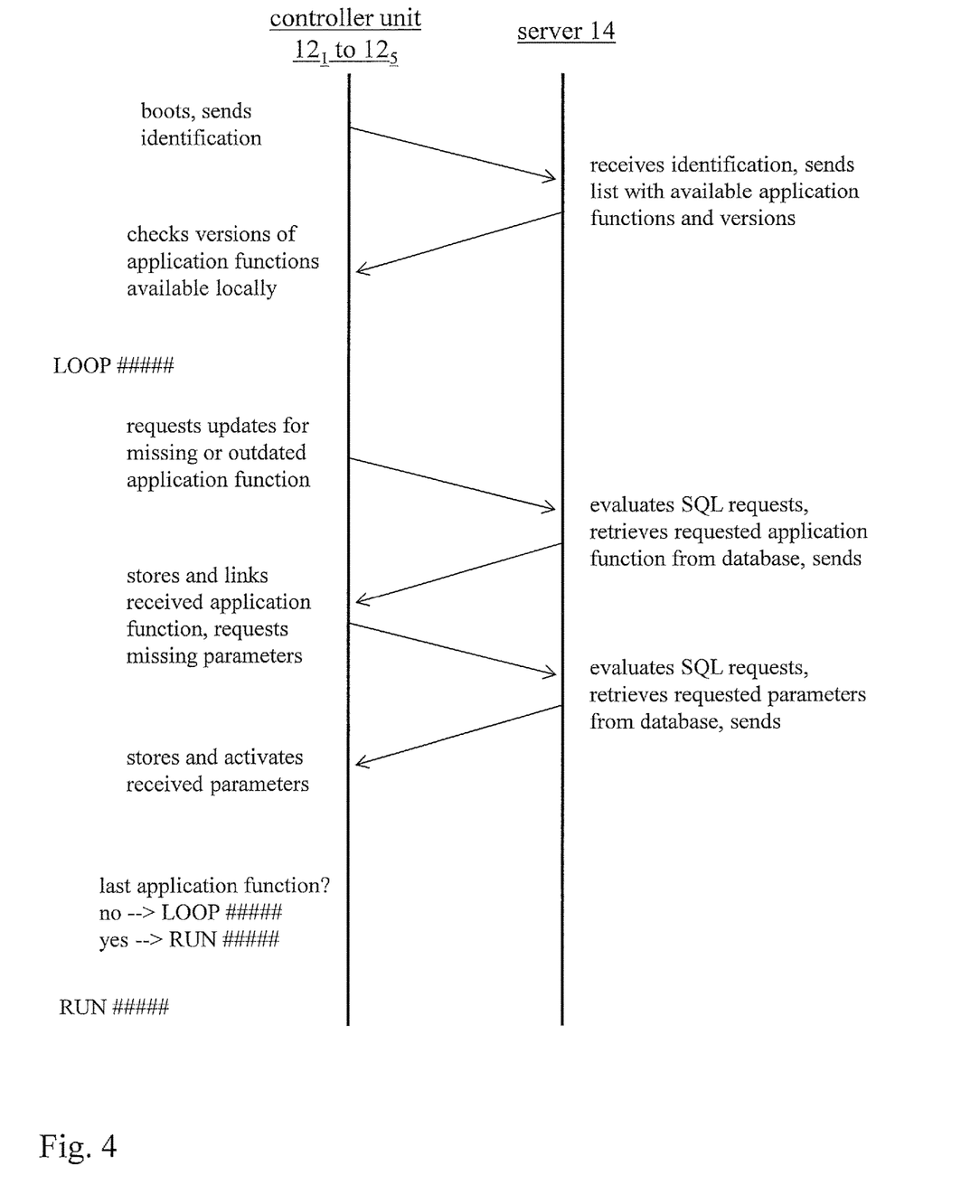
FIG. 4 is a flow diagram illustrating the communication between a controller and server in a method for automated configuration according to an embodiment.

FIG. 4 schematically illustrates an example of the communication between an industrial controller unit 12$_1$ to 12$_5$ and the database server 14 once the respective industrial controller unit 12$_1$ to 12$_5$ is added to the industrial control environment 10, i.e., is newly connected or re-connected to the control network 16.

Once the respective industrial controller unit 12$_1$ to 12$_5$ has booted and has connected to the control network 16, it may send an identification to the database server 14 via the control network 16. For instance, the identification may comprise a name of said industrial control unit 12$_1$ to 12$_5$ together with its network address.

The database server 14 receives this identification, and may respond by sending a list of available application functions and versions to the industrial controller unit 12$_1$ to 12$_5$ in accordance with its database 18.

Upon receiving the list of application functions and versions, the respective controller unit 12$_1$ to 12$_5$ compares them against the versions of the application functions it has available locally. Based on this comparison, the respective industrial controller unit 12$_1$ to 12$_5$ determines whether it requires updates for any of the application functions. For instance, the industrial controller unit 12$_1$ to 12$_5$ may determine that an update is required for an application function F if the version number of the application function F stored locally in the industrial controller unit 12$_1$ to 12$_5$ is lower than a version number in the list received from the database server 14.

If the controller unit 12$_1$ to 12$_5$ determines that it requires an update for a particular application function F, it sends a corresponding request to the database server 14 via the control network 16. For instance, the request may be in the form of an SQL (structured query language) request, or in another programing language designed for managing data held in databases.

The database server 14, upon receiving the SQL request, may retrieve the requested application function from the database 18, and may send it to the respective requesting industrial controller unit 12$_1$ to 12$_5$ over the control network 16.

The respective controller unit 12$_1$ to 12$_5$ may store the received application function F locally in its memory, and may link the application function F in its industrial control program.

The controller unit 12$_1$ to 12$_5$ may then check whether it requires any parameters pertaining to the updated application function F. For instance, in case the application function F is a visualization function, the parameters it requires may relate to the type of display device on which the visualization shall be displayed.

In case the respective controller unit 12$_1$ to 12$_5$ determines that parameters for the application function F are missing, it may send a corresponding request to the database server 14 via the control network 16. Again, the request may be in the SQL format.

The database server 14 may evaluate the SQL request, may retrieve the requested parameters from the database 18, and may send them to the requesting industrial controller unit 12$_1$ to 12$_5$ via the control network 16.

The respective controller unit 12$_1$ to 12$_5$ may store the received parameters locally, and may activate them for incorporation into the application function F.

The industrial controller unit 12$_1$ to 12$_5$ may repeat the process of requesting updates and parameters as described above until all its application functions are up to date, and all the corresponding parameters have been received from the database server 14.

Once the update is complete, the respective controller unit 12₁ to 12₅ may start to run the industrial control program.

In the example described above with reference to FIG. 4, the update is controller-initiated, in that the respective controller unit 12₁ to 12₅ determines the required updates of a particular application function F and parameters, and requests them at the server 14. However, this is merely an example. In other embodiments, the update may be server-initiated. In these embodiments, the respective controller unit 12₁ to 12₅ may initially provide its identification to the server 14, such as in the boot process, as described with reference to FIG. 4 above. The server 14 may then determine, based on its database contents, which application functions and parameters are needed at a particular controller unit 12₁ to 12₅, and may provide them to the respective controller unit 12₁ to 12₅.

The description of the embodiments and the Figures merely serve for illustrating examples of the invention and the numerous advantages resulting therefrom, but should not be understood to imply any limitation. The scope of the invention is to be determined from the appended claims.

REFERENCE SIGNS

10 industrial control environment
12₁-12₅ industrial controller units
14 database server
16 control network
18 database of database server 14
20 application function table
22 controller table
24 parameter table
26 client interface
28 compiler unit

What is claimed is:

1. A method for automated configuration of an industrial controller comprising:
   providing, by said industrial controller, an identification to a server connected to said industrial controller via a network, said identification identifying said industrial controller;
   receiving, by said industrial controller, from said server via said network in response to providing said identification to said server, a list of industrial programs available for configuration;
   selecting, by said industrial controller, from said list of industrial programs, a desired industrial program;
   requesting, by said industrial controller, said desired industrial program from said server via said network; and
   receiving, by said industrial controller, said desired industrial program in accordance with said identification from said server via said network.

2. The method according to claim 1, wherein said industrial controller provides said identification upon being connected to said network, or upon a command or selection by a user, or upon occurrence of a pre-defined event, or cyclically.

3. The method according to claim 1, wherein said identification comprises a name and/or type and/or serial number and/or network address of said industrial controller.

4. A method for automated configuration of an industrial controller, comprising:
   receiving, at a server, an identification from an industrial controller connected to said server via a network, said identification identifying said industrial controller;
   providing, to said industrial controller via said network and in response to said identification received from said industrial controller, a list of industrial programs available for configuration on said industrial controller;
   receiving, from said industrial controller via said network, a request for a desired industrial program, said request being representative of a selection of said desired industrial program by said industrial controller based on said list of industrial programs; and
   providing said desired industrial program to said industrial controller via said network in accordance with said identification.

5. The method according to claim 4, wherein providing said desired industrial program further comprises providing said desired industrial program and/or a parameter for said desired industrial program to a group of industrial controllers, said group comprising at least two industrial controllers.

6. The method according to claim 4, wherein said server comprises a database unit, said database unit comprising industrial programs and associated program code and a table listing industrial controllers and associated industrial programs and/or associated parameters, and wherein said industrial program and/or a parameter for said industrial program is provided to said industrial controller by querying said table.

7. The method of claim 4, further comprising:
   determining, by the server, a plurality of available application functions based on the received identification from the industrial controller; and
   sending, by the server, the plurality of available application functions to the industrial controller.

8. The method of claim 7, wherein sending, by the server, the plurality of available application functions further comprises sending versions corresponding to the plurality of available application functions, and wherein the method further comprises:
   receiving, by the server, a request from the industrial controller, the request identifying a requested application function; and
   sending, by the server, the requested application function to the industrial controller to cause the industrial controller to link the requested application function in an industrial control program of the industrial controller.

9. The method of claim 8, further comprising:
   receiving, by the server, a request from the industrial controller that includes a requested parameter associated with the requested application function, the requested application function being a visualization function to cause visualizations to be displayed via the industrial controller, and wherein the requested parameter corresponds to a display type to use to perform visualizations; and
   sending, by the server, the requested parameter to the industrial controller to cause the industrial controller to store and activate the requested parameter such that the visualization function utilizes the stored requested parameter when displaying visualizations.

10. The method of claim 4, further comprising:
    receiving a plurality of update requests from the industrial controller, the plurality of update requests corresponding to a plurality of application functions locally stored on the industrial controller; and sending responses to the industrial controller to cause the industrial controller to update each application function of the plurality of locally stored application functions on the industrial controller.

11. The method of claim 4, further comprising:
sending, by the server, at least one application function and/or parameter to the industrial controller based on the received identification, the at least one application function and/or parameter being selected based querying a database to identify application functions and/or parameters for updating.

12. The method of claim 4, wherein providing an industrial program and/or a parameter for an industrial program to said industrial controller via said network in accordance with said identification further comprises sending source code to the industrial controller to cause the industrial controller to update an associated industrial program by compiling the source code.

13. An industrial controller, comprising:
an identification unit adapted to provide an identification from said industrial controller to a server connected to said industrial controller via a network, said identification identifying said industrial controller;
a controller receiving unit adapted to receive, from said server via said network in response to said identification, a list of industrial programs available for configuration; and
a controller processing unit adapted to select, from said list of industrial programs, a desired industrial program, and to request said desired industrial program from said server via said network;
wherein said controller receiving unit is adapted to receive, from said server via said network, said desired industrial program in accordance with said identification.

14. The industrial controller according to claim 13, wherein said identification unit is adapted to receive, from a user, a user command or user input, and is adapted to provide said identification in response to said user command or user input.

15. A server for an industrial controller, comprising:
a server receiving unit adapted to receive an identification from an industrial controller connected to said server via a network, said identification identifying said industrial controller; and
a configuration unit adapted to provide to said industrial controller via said network and in response to said identification received from said industrial controller, a list of industrial programs available for configuration on said industrial controller;
wherein said server receiving unit is adapted to receive, from said industrial controller via said network, a request for a desired industrial program of the list of industrial programs, said request being representative of a selection of said desired industrial program by said industrial controller; and
wherein said configuration unit is adapted to provide said desired industrial program to said industrial controller via said network in accordance with said identification.

16. The server according to claim 15, wherein said configuration unit is adapted to provide said desired industrial program and/or a parameter for said desired industrial program to a group of industrial controllers, said group comprising at least two industrial controllers.

17. The server according to claim 15, further comprising a database unit, said database unit comprising industrial programs and associated program code, and/or a table listing industrial controllers and associated industrial programs and/or associated parameters, wherein said configuration unit is adapted to provide said desired industrial program and/or a parameter for said desired industrial program to said industrial controller in accordance with said database unit in accordance with said table.

18. A system for automated configuration of an industrial controller comprising:
a server and at least one industrial controller connected to said server via a network, said server comprising:
a server receiving unit adapted to receive an identification from said at least one industrial controller, said identification identifying said at least one industrial controller; and
a configuration unit adapted to provide to said at least one industrial controller via said network and in response to said identification received from said at least one controller, a list of industrial control programs available for configuration on said at least one industrial controller;
wherein said server receiving unit is adapted to receive, from said at least one industrial controller via said network, a request for a desired industrial program; and
wherein said configuration unit is adapted to provide said desired industrial program to said at least one industrial controller via said network in accordance with said identification; and
said at least one industrial controller comprising:
an identification unit adapted to provide said identification from said at least one industrial controller to said server;
a controller receiving unit adapted to receive, from said server via said network in response to said identification, said list of industrial programs available for configuration; and
a controller processing unit adapted to select, from among said list, said desired industrial program, and to request said desired industrial program from said server via said network;
wherein said controller receiving unit is adapted to receive, from said server via said network, said desired industrial program in accordance with said identification.

* * * * *